Feb. 6, 1968  C. C. FARQUE  3,367,237
VERTICAL SHAPING MACHINE
Filed Dec. 6, 1965  3 Sheets-Sheet 1

INVENTOR
Carl C. Farque, deceased,
By Alice A. Farque, executrix,
BY Watson, Cole, Grindle & Watson,
ATTORNEYS Feb. 6, 1968     C. C. FARQUE     3,367,237
VERTICAL SHAPING MACHINE
Filed Dec. 6, 1965     3 Sheets-Sheet 2
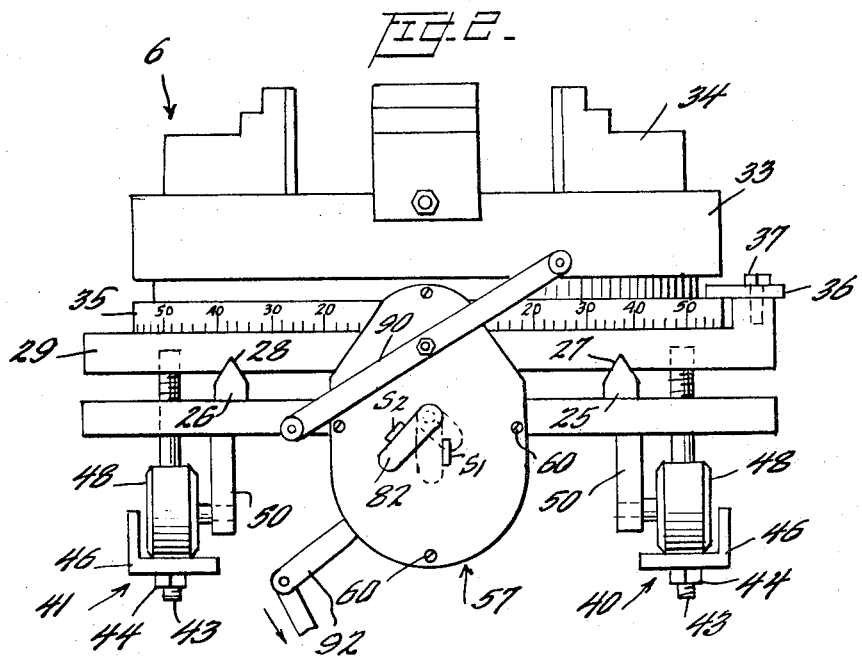
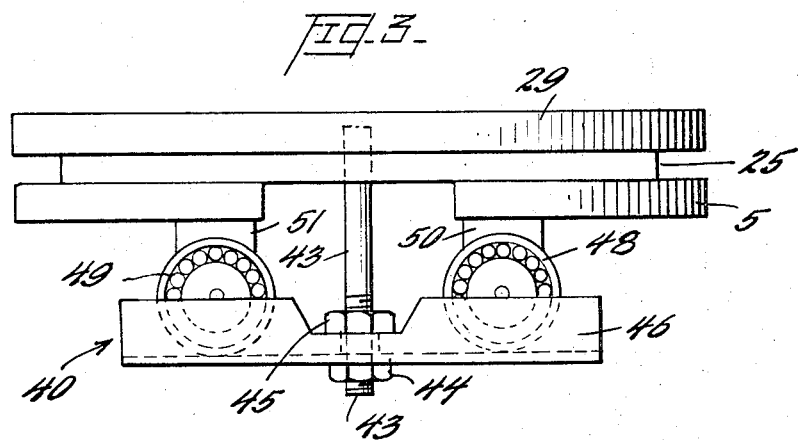
INVENTOR
Carl C. Farque, deceased,
Alice A. Farque, executrix,
BY Watson Cole, Grindle & Watson,
ATTORNEYS Feb. 6, 1968  C. C. FARQUE  3,367,237
VERTICAL SHAPING MACHINE
Filed Dec. 6, 1965  3 Sheets-Sheet 3
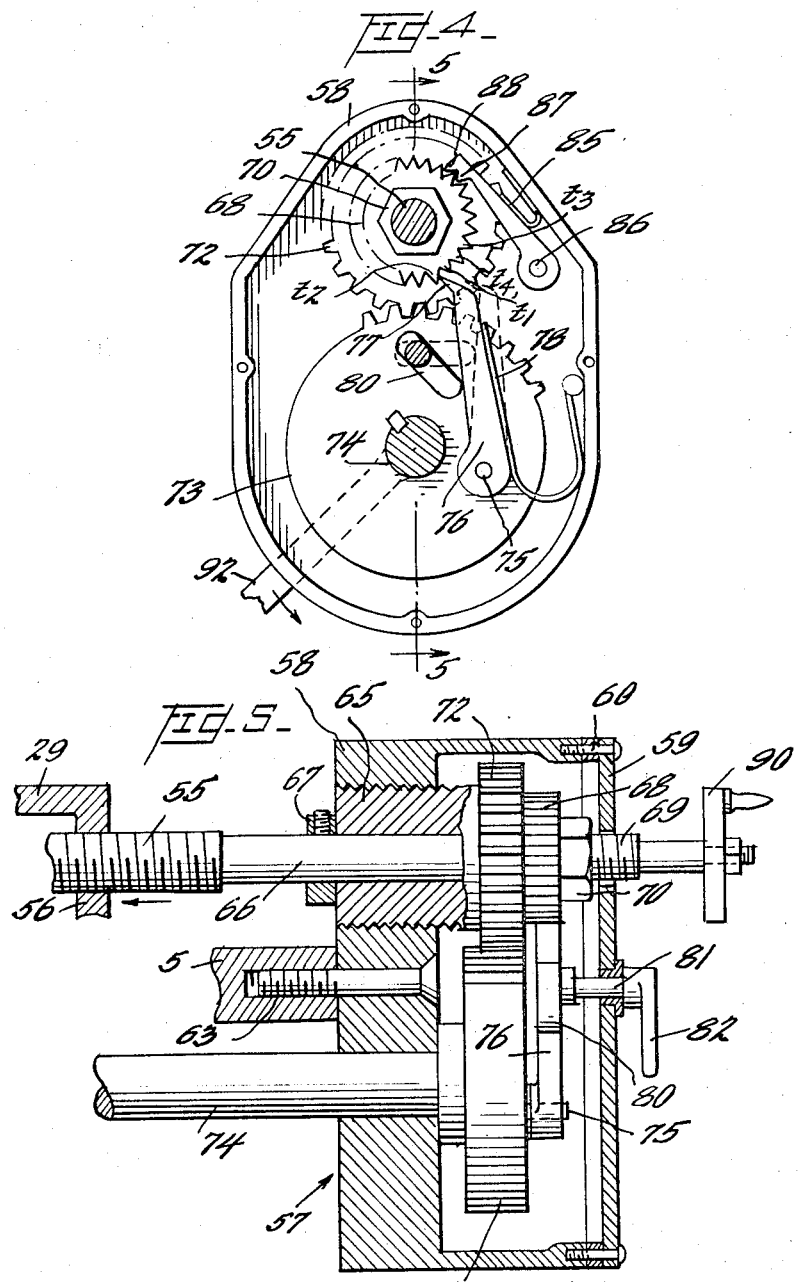
INVENTOR
Carl C. Farque, deceased,
Alice A. Farque, executrix,
BY Watson, Cole, Grindle & Watson,
ATTORNEYS

3,367,237
VERTICAL SHAPING MACHINE

Carl C. Farque, deceased, late of San Antonio, Tex., by Alice A. Farque, executrix, San Antonio, Tex., assignor, by mesne assignments, to Petty Geophysical Engineering Company, Inc., San Antonio, Tex., a corporation of Texas Filed Dec. 6, 1965, Ser. No. 511,910
10 Claims. (Cl. 90—45)

This invention relates to machine tools and, more particularly, to vertical shaping machines for accurately shaping keyseats, splines, gear teeth, and the like.

It is known in vertical shaping machines, such as key seating or splining machines, to mount the workpiece in a feed table that moves in the horizontal plane for feeding said workpiece into feeding engagement with a vertically reciprocating tool. It is also known in these machines to provide apparatus for withdrawing the feed table a slight distance during each return stroke of the tool to relieve the tool whereby it will not scrape the workpiece during said return stroke. One machine of this type that has been proposed employs a power screw that is utilized to provide intermittent unidirectional increments of feed through a pawl and ratchet arrangement with the power screw being shifted axially to provide the slight withdrawing movement prior to the return stroke of the tool. It is this type of machine with which the present invention is concerned.

As in all machine tools, controlled engagement between the workpiece and the tool is of extreme importance in this type of machine in order to provide an acceptable work product within the required limits of accuracy to thereby reduce the number of rejects or faulty pieces. As will be realized by those skilled in this art, in order to provide an accurately machined keyseat, spline, geartooth or other similar structure, the workpiece upon which the structure is formed must be held stationary during the machining operation to give the required accuracy. However, because of the nature of the machining operation that employs a vertically reciprocating tool to remove a certain amount of material during each cutting stroke, there has heretofore been the problem of preventing the movement of the feed table against the horizontal forces that act on the workpiece during the cutting stroke.

In prior devices of the type described of which I am aware, this function of holding the workpiece stationary during the cutting stroke of the machine is necessarily performed by the indexing structure including the power screw, the pawl and ratchet and the withdrawing means since the forces are transferred directly to this structure through the feed table. However, experience has shown that the use of the indexing means of the shaping machine to perform this holding function leaves much to be desired since this means that the ability of the feed table to be held stationary and thus the accuracy of the machining operation depends on the closeness of the fit between these several parts of the indexing mechanism. That is to say, if the parts of the indexing mechanism and the feed screw are not perfectly machined or if they have been subject to wear, the accuracy of the machining operation is threatened since when the cutting stroke causes a horizontal component of force to act against the feed table, the slack or flexure in these parts necessarily causes a change in the position of the feed table thus destroying the accuracy with which the tool engages the workpiece.

According to the present invention, this problem of inaccuracy due to slippage or flexure of the indexing mechanism has been overcome by providing a feed table with novel means for adjusting the frictional resistance presented along the guideways of the feed table in such a manner that the starting friction of said feed table, that is, the amount of force resisting the initial movement of the feed table from a rest position, is sufficient in itself to prevent movement of the feed table and the workpiece during the cutting stroke of the machine so that there are no horizontal forces transferred to the indexing means that could destroy the accuracy of the machining operation.

According to a related aspect of the present invention, the indexing means for feeding the workpiece toward the tool prior to each cutting stroke and for withdrawing the workpiece to relieve the tool prior to each return stroke is provided that requires a minimum amount of driving force for overcoming the increased starting friction of the feed table, that accurately holds the workpiece in position, and which indexing means operates in a smooth manner without employment of complicated mechanisms.

To accomplish these ends, the feed table includes a pair of runners that cooperate with fixed roller bearings to increase the pressure along the slide ways of the feed table so that the starting friction at the slide ways is sufficient to prevent any change in position of the feed table during the cutting stroke of the tool. The indexing means of the invention include a gear segment that is adapted for back-and-forth rotation through a limited arc of movement, said gear segment having a two-fold function of providing the increment of feed prior to each feeding stroke, as well as providing the withdrawing movement of the feed table to relieve the tool during the return stroke. To do this, the gear segment carries a pawl that cooperates with a ratchet wheel mounted on the power screw to provide the stepped increase, and said gear segment directly engages a geared collar which is threaded in the housing and held captive on said power screw in the axial direction to provide the tool relief. Accordingly, the two separate functions take place concurrently since they are responsive to the same element, namely, the rotating gear segment, and because of this fact, the substantial driving force created by the gear segment and threaded collar arrangement for axially shifting the power screw is available in both directions of movement of the feed table to overcome the substantial starting friction of said feed table. Once the starting friction, which is sometimes increased by 60 to 70% over the normal sliding friction of the feed table, is thus advantageously overcome, the simple pawl and ratchet arrangement is employed to provide the stepped increase in depth of cut of the tool without difficulty or strain on these parts.

An additional advantage associated with the present invention is provided by employing a controllable elastic source of power for the horizontal feed of the feed table whereupon a simple adjustable micrometer stop may be provided for engagement of the feed table to determine the depth of cut being formed without fear of jamming or damaging the cooperating surfaces of the parts upon reaching the pre-set limit. In other words, according to the present invention, the stop may be set for a precisely given point whereupon the machine will continue to cycle until that point is reached where the feed table engages the end of the stop and thus prevents the spring from moving the table. This feature gives added accuracy to the machining operation since there is no dependency on the engagement and actuation of the usual interrupters or tripping devices that because of friction and wear of parts tend to be considerably less accurate.

Thus, it is one object of the present invention to provide a machine tool having improved means for automatically and uniformly feeding the workpiece with respect to the tool.

It is another object of the present invention to provide an indexing means and cooperating feed table that is adapted for extremely accurate positioning of the work during each cycle of the machine.

It is still another object of the present invention to provide a machine tool of the type described having an improved feed table having means for restraining movement of the feed table in the plane transverse to the plane of movement of the tool for more accurate positioning of the workpiece with respect to the tool during the machining operation.

It is another object of the present invention to provide a machine tool of the type described having an improved indexing means which is operable from a single rotating element to provide for feeding the workpiece toward the tool prior to each cutting stroke and for withdrawing the workpiece to relieve the tool prior to each return stroke.

It is still a further object of the present invention to provide an indexing means for a feed table that is restrained in its movement wherein the means for shifting the power screw in the axial direction to withdraw the feed table during the return stroke is operative to overcome the increased starting friction of the turntable so that the stepping device or the feeding apparatus is not overloaded.

It is still a further object of the present invention to provide a machine tool wherein the indexing means operates a feed table in a smooth and efficient manner in response to a controllable elastic source of power and wherein the limit of movement of said feed table is determined by a stop screw mounted on the frame of the machine tool for engagement with said feed table.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Referring now to the drawings:

FIG. 2 is a front view of the feed table and indexing mechanism of the apparatus illustrated in FIG. 1;

FIG. 3 is a partial side view of the feed table of FIG. 2;

FIG. 4 is a front view of the indexing apparatus with the front cover being removed to expose the working parts; and FIG. 5 is a sectional view taken along lines 5—5 of FIG. 4.

Figure 1:
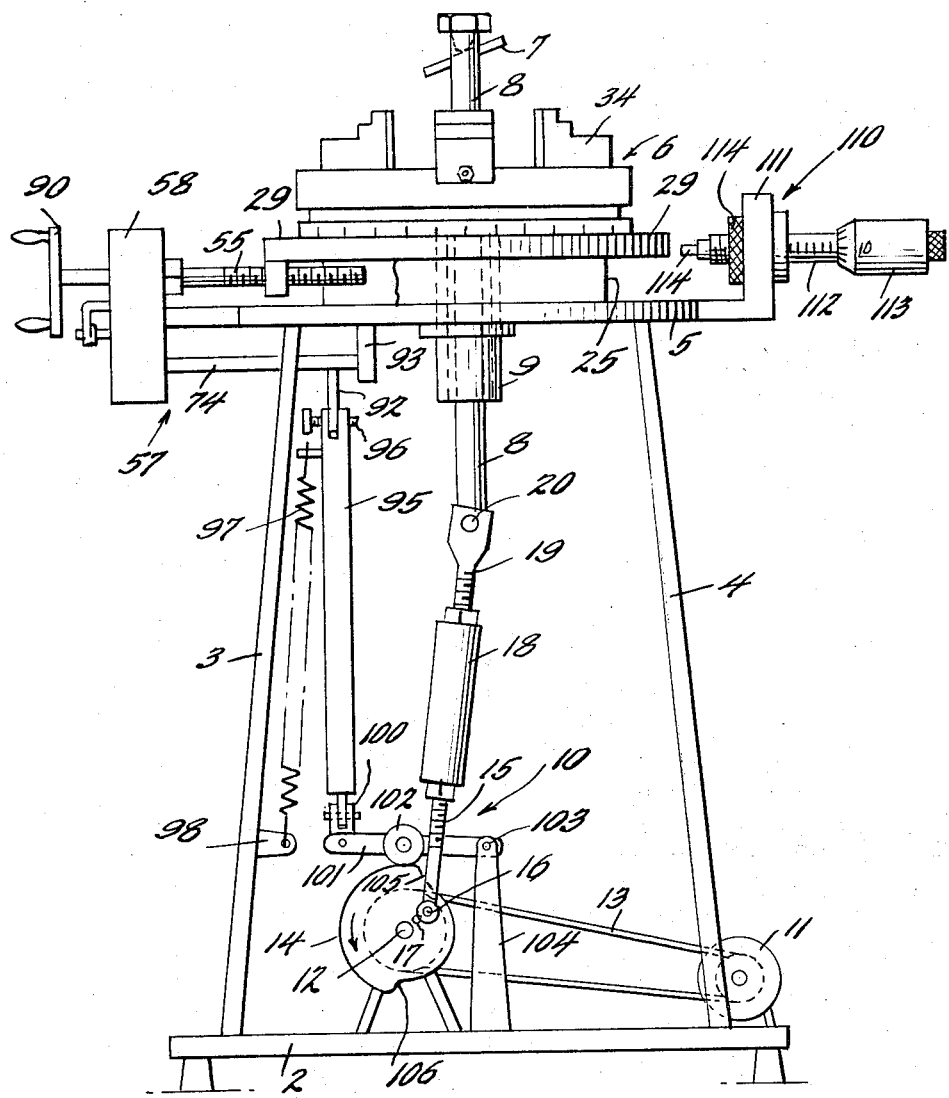
FIGURE 1 is a side view of the machine tool constructed in accordance with the present invention.

Referring first to FIGURE 1, the general arrangement of a vertical shaping machine, generally designated by the reference numeral 1, is shown for the purpose of illustrating one application of the present invention. The frame of the vertical shaping machine 1 takes a suitable form including a base 2 and upwardly extending side members 3, 4 that serve to support a mounting plate 5 for presenting a feed table 6 at a convenient height above the floor to provide ready access for the loading and unloading operations.

To perform the machining operation on a workpiece (not shown in any of the drawings) that has been suitably clamped to the feed table 6, there is provided a conventional shaping tool 7 that is carried by a reciprocating tool head 8 suitably mounted for sliding movement in a collar bearing 9 which is centrally disposed in the mounting plate 5. The elongated mounting head 8 is engaged at its lower end by an adjustable reciprocating driving system, generally represented by the reference numeral 10. The driving system 10 conveniently takes the form of a motor 11 suitably mounted on the base 2 and adapted to drive the shaft 12 through a belt 13 and associated pulley and gearing arrangement, which is well known in the art.

In the illustration shown, the shaft 12 mounts a drive plate 14 that is, in turn, connected to a lower connecting rod 15 by a crank pin 16, which is adapted to be positioned in any one of several apertures 17 formed at different radii on the drive plate 14 to vary the length of the stroke of the reciprocating tool 7 in a well-known manner. An adjusting collar 18 adjustably links the lower connecting rod 15 with an upper connecting rod 19 having a pivot pin 20 for interconnecting the drive system 10 with the tool head 8. It can be seen that by adjusting the turnbuckle collar 18 the relative position of the tool 7 at any given point of the cycle may be adjusted to suit the particular machining operation being performed.

According to one aspect of the present invention, the feed table 6 is mounted so that its horizontal movement into the path of the reciprocating tool 7 is restrained so that the force of the tool during the cutting stroke will not disturb the accurate positioning of the workpiece being held in the feed table 6. As indicated above, I have discovered that this purpose can be accomplished by providing sufficient friction to resist the movement of the feed table 6 so that the starting friction of said feed table can not be overcome by the force of the tool 7 during the machining operation. The manner in which the feed table 6 is constructed can best be seen in FIGS. 2 and 3 of the accompanying drawings, wherein is shown a pair of upwardly extending guides 25, 26 integral with the mounting plate 5 that serves to engage cooperating slideways 27, 28 on a chuck plate 29 that serves to form the base of the feed table 6.

Mounted on the chuck plate 29, in a manner such as to permit rotational positioning, is a chuck 33 having jaws 34 that operate in the usual manner to clamp the workpiece in position for the machining operation; said chuck 33 being of the four-jaw type, as illustrated, or any other suitable configuration. Situated at the base of the chuck 33 is a suitable indicator rim 35 used in the rotational positioning of the workpiece mounted in the chuck 33; said chuck 33 being capable of being clamped in the desired position by any number of suitable chuck clamp members 36 that are conveniently operated by the hex bolts 37.

For the purpose of adjusting the engaging relationship between the guides 25, 26 and the cooperating slideways 27, 28 in the chuck plate 29 and to insure that there is sufficient frictional resistance between these cooperating parts to prevent unwanted horizontal movement of the feed table 6 during the machining operation, there is provided a pair of hold-down clamps, generally designated by the reference numerals 40 and 41 for adjusting the engaging pressure.

As best shown in FIG. 3, the hold-down clamp 40 comprises a hold-down screw 43 having threaded ends; one end being threadedly engaged with the movable chuck plate 29 and the other end being engaged by a pair of locking nuts 44, 45, such that an adjustable runner 46 is carried by the chuck plate 29. Acting against the horizontal leg of the runner 46 is a pair of stationary ball bearings 48, 49 carried on rigid supports 50, 51 depending from the stationary base plate 5, as illustrated in this figure. When tension in the chuck hold-down screw 43 is properly adjusted, the runner 46 will bear with increased pressure against the bearings 48, 49 which, in turn, increases the frictional resistance between the guide 25 and the cooperating slideway 27. The hold-down device 41 shown in FIG. 2 has like elements similarly designated as in hold-down device 40 and can be likewise properly adjusted to provide increased friction between the guide 26 and the cooperating slideway 28 so that the over-all result is that the table 6 is held steady in any horizontal position in which it is placed until a sufficient force is provided to overcome the starting friction.

Horizontal feed of the feed table 6 to overcome this friction and to move the workpiece into the path of the reciprocating tool 7 to effect the machining operation is accomplished by movement of a power screw 55 that threadedly engages the downwardly extending ear 56 on the front of the chuck plate 29, as viewed in FIGS. 1 and 5. This power screw 55 is operated by a simple and compact indexing mechanism of the present invention, that is generally designated by the reference numeral 57, and which is especially adapted to operate in an advantageous manner to provide a smooth and efficient feed movement of the feed table 6 in the horizontal direction against the increased frictional resistance offered by the cooperation of guides 25, 26 and slideways 27, 28, just discussed.

To understand the functioning of this portion of the invention, reference is now made to FIGS. 2, 4 and 5 of the drawings wherein it can be seen that the indexing means 57 is arranged in a compact manner in the housing 58 that has a front cover 59 (FIGS. 2 and 5) suitably fastened thereto by any number of screws 60. As illustrated in FIG. 5, the housing 58 is attached to the mounting plate 5 of the shaping machine 1 by any number of suitable fastening screws 63. The power screw 55 that serves to move the feed table 6 in the horizontal direction passes through and is supported by a feed collar 65 that threadingly engages the rear wall of said housing 58; the bore of said collar 65 rotatably receiving an unthreaded portion 66 of said power screw 55. An integral retaining member 67 on said power screw 55 is positioned to engage the rear end face of said collar 65 and a ratchet wheel 68 is adapted to engage the opposite end face of the collar 65 so that the power screw 55 is held captive to said threaded collar 65.

For convenience, the ratchet wheel 68 threadedly engages the power screw along a threaded portion 69 and is locked against axial movement by a lock nut 70. As a result, it can be seen that adjustment of the axial position of the ratchet wheel 68 is possible so that the collar 65 can be held in close axial relationship with the power screw 55. Thus, when the collar 65 is given rotary movement in the manner to be indicated presently, said collar 65 and said power screw 55 both move in the axial direction due to the threaded engagement of said collar 65 with the back of the housing 58 to thereby provide the withdrawing movement of the feed table 6 to relieve the tool 7 at the proper time. Also, with this arrangement of parts, the assembly of the indexing means 57 is greatly facilitated since the ratchet wheel 68 and the cooperating lock nut 70 can be slipped over the end of the power screw 55 after it has been placed in position in the feed collar 65.

The feed collar 65 has a gear portion 72 that is adapted to transmit the requisite power for the axial withdrawing and repositioning shift of the frictionally restrained feed table 6. As best shown in FIG. 4, this gear portion 72 is engaged by a gear segment 73 in driving relationship which, in turn, is fixedly mounted on a drive shaft 74 that is journaled for rotation in the housing 58 (FIG. 5). In operation, the drive shaft 74 rotates back and forth so that the gear segment 73 and the gear portion 72 assume a like rotation through a corresponding limited arc of movement. By properly selecting the pitch of the thread on the feed collar 65, the relief movement of the feed table 6 is made to be just sufficient to allow the tool 7 to clear the workpiece and thus is substantially less than the stepped feed movement provided by the intermittent rotation of the power screw 55 driven by means presently to be described. This arrangement of the gear segment 73 driving the threaded collar 65 is particularly advantageous in that substantial mechanical advantage is provided to overcome the starting friction of the feed table 6 during both the feeding and withdrawing operations of the system.

Fixed to the face of the gear segment 73 is a pivot pin 75 (FIGS. 4 and 5) that is spaced from the drive shaft 74 and mounts a pawl 76 having a driving finger 77 for engagement with the teeth of the ratchet wheel 68, in the manner shown in FIG. 4, to complete the intermittent stepping arrangement for the power screw 55. A spring 78 is provided to urge the pawl 76 in the counter-clockwise direction as viewed in FIG. 4 in such a manner that the finger 77 of the pawl 76 is assured of contacting the exposed teeth of the ratchet wheel 68 on the right-hand side thereof when the gear segment 73 is rotated in the counter-clockwise direction. A cam stop 80 is situated on the opposite side of the pawl 76 from the spring 78 so as to limit the pivotal movement of the pawl 76 in the counter-clockwise direction to thus guide the same during the upward driving stroke. As can be seen in FIG. 5, the cam stop 80 is carried by a shaft 81 that is rotatably mounted by the coverplate 59 and a handle 82 is suitably positioned on the end of said shaft 81 for effecting angular adjustment of the cam stop 80.

To further explain this feature of the invention, reference is made to FIG. 4 where it can be seen that the pawl 76 can be variably positioned between the solid-line position wherein the drive finger 77 is caused to be positioned between the teeth $t_1$ and $t_2$ and the dotted-line position wherein the pawl 76 assumes an idling condition during which the drive finger 77 will not engage any of the teeth of the ratchet wheel 68. At a selected intermediate position between the full-line and dotted-line positions, a decreased feed is obtained since in this case any number of teeth of the ratchet wheel 68 can be by-passed during the driving movement of said pawl 76. For example, in the present instance a lower feed rate of the workpiece is provided by positioning the handle 82 half-way between stops $s_1$ and $s_2$ (FIG. 2) that determine the limits of the handle 82 whereupon the driving finger 77 will engage between the gear teeth $t_3$ and $t_4$ (FIG. 4). In the preferred form of the invention illustrated, the design of the ratchet wheel is such that this decreased feed is equal to one-half of the full feed, i.e., the driving finger 77 is allowed to engage the ratchet wheel 68 to drive the same through a distance equal to one-half of the distance that would be driven if the driving finger is allowed to engage said ratchet wheel 68 between the gear teeth $t_1$, $t_2$ (full-line position of cam stop 80).

A holding pawl or detent 85 is pivotally mounted by the pin 86 fixed to the rear wall of the housing 58, said pawl 85 having a pair of fingers 87, 88 that are adapted to embrace a single tooth of the ratchet wheel 68 to maintain the ratchet wheel in a fixed position during the clockwise rotation of the gear segment 73 that returns the pawl 76 to its original position. In addition to the fingers 87, 88 being designed so that the backward movement of the ratchet wheel 68 is prevented during this repositioning of the feed pawl 76, the faces of the fingers are such that the holding pawl 85 serves to center the embraced tooth between the fingers 87, 88 so that if there should be a slight discrepancy in the action of the feed pawl 77 during the feed stroke this will tend to be corrected by this self-centering arrangement.

The retaining feature of the holding pawl or detent 85 is such that its holding effect can be over-ridden at any time that it is desired to manually position the power screw 55 by means of a handwheel 90, that is suitably fixed to the end of the power screw 55 (see FIGS. 1 and 5). Thus, it will be realized that the initial set-up can be rapidly carried out by use of the handwheel 90 while at the same time there is provided an efficient one-way clutch for the intermittent rotation of the power screw 55 during the automatic operation.

To cause the necessary back-and-forth rotation of the shaft 74 for driving the indexing device 57, a lever 92 is fixed to said drive shaft 74 adjacent a rear support 93 that depends from the mounting plate 5, as shown in FIG. 1. This lever 92, as viewed in FIGS. 2 and 4, provides a counter-clockwise driving force (note arrow in these figures) to the gear segment 73, in response to the downward movement of drive rod 95 (FIG. 1) connected thereby by a suitable fastening pin 96. A power spring 97 is connected between the movable connecting rod 95 and a stationary bracket 98 secured to the side wall 3, so that the connecting rod 95 is at all times tended to be drawn downwardly, as viewed in FIG. 1. This downward driving force of the spring 97 acts through a universal joint 100 against the lever 101 that carries a cam follower 102 and tends to rotate the lever 101 about its fulcrum at 103 which is provided by an upwardly extending support 104.

The roller 102 acts in response to the cam wheel 14 and in particular in response to a pair of riser portions 105, 106 that are spaced 180° apart, said riser portion 105 allowing the connecting rod 95 to move downwardly on the driving stroke and said riser portion 106 serving to urge said connecting rod 95 upwardly to reset the spring 97 for the next cycle. In other words, during operation of the machine 1, the cam riser surface 105 is positioned in operative engagement with the follower 102 upon counter-clockwise rotation of the cam wheel 14, the spring 97 acts to direct the connecting rod 95 downwardly which, in turn, imparts the required counter-clockwise driving movement to the lever 92 for the feeding operation; then, after the cam wheel 14 has rotated 180°, the cam riser surface 106 is engaged by the follower roller 102 and the connecting rod will then be raised again to load the spring 97 in readiness for the next spring-driven driving operation of the indexing device 57.

From the foregoing, the over-all operation of the apparatus of the present invention should now be apparent. In short, upon driving the cam wheel 14 in the counter-clockwise direction as indicated by the arrow in FIG. 1, and as soon as follower roller 102 reaches the cam riser portion 105 (at which time the tool 7 is at its highest point), then the power spring 97 is allowed to impart the forward rotary motion to the drive shaft 74 which, in turn, serves to rotate the gear segment 73 in the counter-clockwise direction as viewed in FIG. 4. When this is done it will be realized that the gear segment 73 immediately proceeds to drive the threaded collar 65. Concurrently, the feed pawl 76 drives the ratchet wheel 68 and, thus, the feed table 6 is shifted axially by the combined action of bodily shifting the power screw 55 in the direction of the solid arrow in FIG. 5 and by the stepped rotation of the power screw 55 thereby causing the feed table 6 to be advanced the required amount against the frictional resistance afforded by the slideways 27, 28. Then, as the cam wheel 14 continues its counter-clockwise movement, the tool 7 engages the workpiece (not shown) and machines the desired slot therein during its downward stroke while the indexing means 57 is held without movement in its forwardmost position by the cam 14. When the cam riser portion 106 engages the follower 102 (at which time the tool 7 is at its lowest point), the connecting rod 95 will be driven upwardly thereby resetting the power spring 97 for the next cycle and, at the same time, rotating the collar 65 so as to shift the power screw 55 to the left, as viewed in FIG. 5, to effect the withdrawing movement of the workpiece from the path of the tool 7 during the impending return stroke of said tool 7.

To effect discontinuance of the indexing operation in an automatic fashion when the workpiece has been machined to the desired depth, there is provided a micrometer stop, generally designated by the reference numeral 110 (see FIG. 1), that is or may be of a conventional design and conveniently located on an upstanding flange 111 at the back of the mounting plate 5. The micrometer stop 110 has the usual linear scale 112 and a rotatable collar handle 113 that in a conventional manner is connected to a feeler screw 114. In the present case the feeler screw 114 serves to engage and stop the feed table 6 by cooperation with the end face of the chuck mounting plate 29 when the machining operation has been carried to the desired depth; a lock cap 115 being provided to rigidly hold the feeler screw 114 in the desired position during the machining operation.

When the chuck mounting plate 29 has reached the position to engage the micrometer stop 110, further horizontal motion is prevented since the force available from the power spring 97 acting through the indexing mechanism 57 and the power screw 55 is restrained. The strength of the spring 97 is desirably selected so as to be insufficient to jam the parts or to distort the mechanism. Further, it will be realized that the depth of the slot cut during its machining operation will be accurately determined since there are no parts of the indexing mechanism 57 that need be disengaged and, thus, no inaccuracies result due to friction or slippage of parts.

Results and advantages of this type of indexing movement operating in conjunction with the feed table 6 having friction means for restraining its movement include a smoothness and uniformity of operation that has heretofore not been attainable. This results from the novel cooperation of the parts set forth above and, in particular, from the simple and compact indexing means 57 operating to axially shift the feed table 6 and to concurrently step the same through the required feed increment whereby the driving force for shifting the feed table is available to overcome the starting friction of said feed table during all periods of movement. Further, the power to effect the shifting and the feed is from the spring 97 giving a desired controlled movement that is capable of discontinuance at the precise point desired merely by adjusting the sensitive micrometer stop 110.

In this disclosure, there is shown and described only the preferred embodiment of the invention, but, as aforementioned, it is to be understood that the invention is capable of various changes or modifications within the scope of the inventive concept as expressed by the accompanying claims.

What is claimed is:

1. In a machine tool including a frame, a cutting tool of the type having a cutting stroke and a return stroke for machining a workpiece, a feed table for supporting said workpiece, a power screw for moving said table with respect to said frame, and friction means for restraining said movement of said table to cause said workpiece to be held stationary during the cutting stroke, the improvement of indexing means comprising a driving gear for rotating back and forth, intermittent stepping means responsive to one direction of rotation of said driving gear for rotating said power screw to move said feed table in a first direction toward said tool prior to said cutting stroke, shifting means responsive to the movement of said driving gear in said one direction for bodily shifting said power screw and said feed table in said first direction concurrently with the stepping movement of said feed table and to shift the same in a second direction away from said tool prior to said return stroke in response to the movement of said driving gear in the opposite direction, whereby the driving force for shifting said power screw is available in both said first and second directions of movement to overcome the starting friction of said feed table.

2. The combination of claim 1 wherein said stepping means includes a pawl pivotally mounted on said driving gear about an axis spaced from the axis of said driving gear and a ratchet wheel fixedly mounted on said power screw and adapted to be drivingly engaged by said pawl.

3. The combination of claim 2 wherein said shifting means includes a collar rotatably mounted on said power screw, means on said power screw for holding said collar captive in the axial direction, said collar having a gear portion drivingly engaged by said driving gear, screw means on said collar threadingly engaging said frame.

4. The combination of claim 3 wherein is further provided a cam stop journalled for rotation on said frame, said cam presenting a variable surface positioned to be slidably engaged by said pawl to urge the latter away from driving relationship with said ratchet wheel, and a handle for rotating said cam stop to present a different part of said surface to said pawl to vary the degree of driving engagement with said ratchet wheel.

5. The combination of claim 3 wherein is further provided spring means for controllably urging said driving gear in said one direction, rotating cam means for urging said driving gear in said opposite direction and adjustable stop means on said frame for limiting the movement of said feed table in said first direction to limit the depth of cut of said tool in said workpiece.

6. A feed table for use in a machine tool requiring restrained intermittent movement of said feed table along a stationary guide means towards the cutting tool comprising a chuck plate, clamping means on said plate to hold said workpiece, slideway means on said chuck plate for cooperating with said stationary guide means, a tension member depending from said plate, a runner connected to the free end of said tension member, said runner presenting a bearing surface facing upwardly and being parallel with said guide means, roller bearing means fixed to said guide means for engaging said bearing surface and means for adjusting the tension in said tension member whereby to vary the friction between said slideway means and said guide means.

7. Indexing means for use with a machine tool feed table adapted for restrained horizontal movement toward and away from a cutting tool, comprising a driving gear for rotating back and forth, intermittent stepping means responsive to one direction of rotation of said driving gear to move said feed table in a first direction toward said tool, shifting means responsive to the movement of said driving gear in said one direction for bodily shifting said feed table in said first direction concurrently with the stepping movement of said feed table and to shift the same in a second direction away from said tool in response to the movement of said driving gear in the opposite direction, whereby the driving force for shifting said feed table is available in both said first and second directions of movement to overcome the starting friction of said feed table.

8. A slotting machine including a frame, a reciprocating head for receiving a cutting tool adapted to cut a slot in a workpiece, a feed table for supporting said workpiece, a power screw for moving said table with respect to said frame in a plane transverse to that of the movement of said reciprocating head, and friction means for restraining said movement of said table to cause said workpiece to be held stationary during the cutting stroke of said tool, indexing means for feeding said workpiece in one direction toward said tool prior to each cutting stroke and for withdrawing said workpiece in the opposite direction to relieve said tool prior to each return stroke, comprising a housing fixed to said frame, a gear segment rotatably mounted on a shaft journalled in said housing, a pawl pivotally mounted on said gear segment about an axis spaced from the axis of said shaft, a ratchet wheel fixedly mounted on said power screw and adapted to be drivingly engaged by said pawl, a collar rotatably mounted on said power screw, means on said power screw for holding said collar captive in the axial direction, said collar having a gear portion drivingly engaged by said gear segment, screw means on said collar threadingly engaging said housing, drive means connected to said shaft for rotating said gear segment back and forth through a limited arc of movement, said pawl and ratchet wheel serving to intermittently rotate said power screw prior to each cutting stroke to move said feed table in said one direction, said collar serving to cause said power screw to shift axially in said one direction concurrently with the intermittent rotation of said power screw and to shift axially in said opposite direction concurrently with the return of said gear segment to its original position to move said feed table in the respective directions, whereby the driving force for shifting said power screw is available in both directions of movement to overcome the starting friction of said feed table.

9. The combination of claim 8 wherein is further provided spring means for controllably urging said gear segment in said one direction, rotating cam means for urging said gear segment in said opposite direction and adjustable stop means on said frame for limiting the movement of said feed table in said first direction to limit the depth of cut of said tool in said workpiece.

10. The combination of claim 8 wherein said feed table further comprises a chuck plate, a tension member depending from said plate, a runner connected to the free end of said tension member, said runner presenting a bearing surface facing upwardly and being parallel with said chuck plate, roller bearing means fixed to said frame for engaging said bearing surface and means for adjusting the tension in said tension member whereby to vary the friction of said feed table.

References Cited
UNITED STATES PATENTS

| | | | |
|---|---|---|---|
| 2,786,397 | 3/1957 | McIlvanie | 90—45 |
| 2,937,732 | 5/1960 | Brady | 90—56 |
| 3,280,449 | 10/1966 | Dever et al. | 90—58 |

GERALD A. DOST, *Primary Examiner.*